May 15, 1928. 1,670,269
H. O. MOEBIUS
COOLING AND DRYING APPARATUS AND PROCESS OF CEMENT MAKING ADAPTED TO BE
CARRIED ON THEREBY
Filed Aug. 2, 1927 2 Sheets-Sheet 1
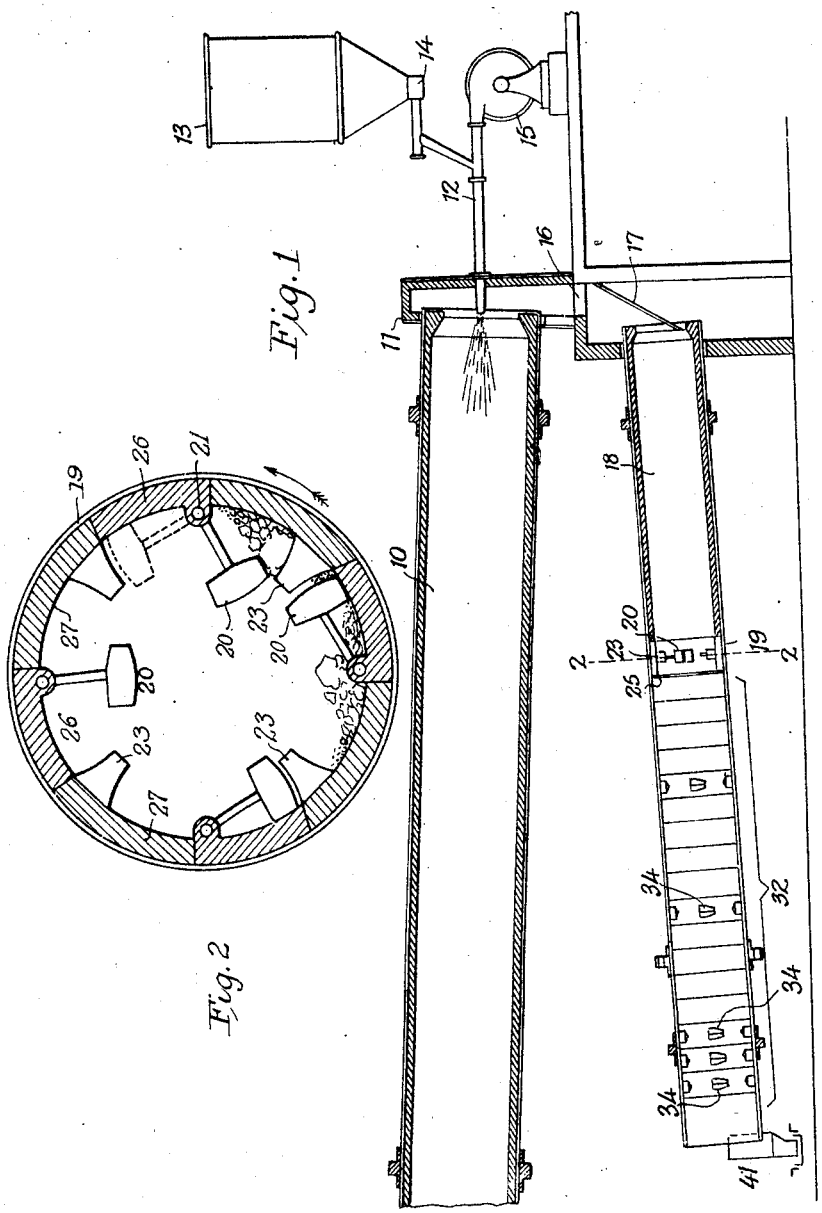
INVENTOR.
H. O. Moebius.
BY
ATTORNEY.

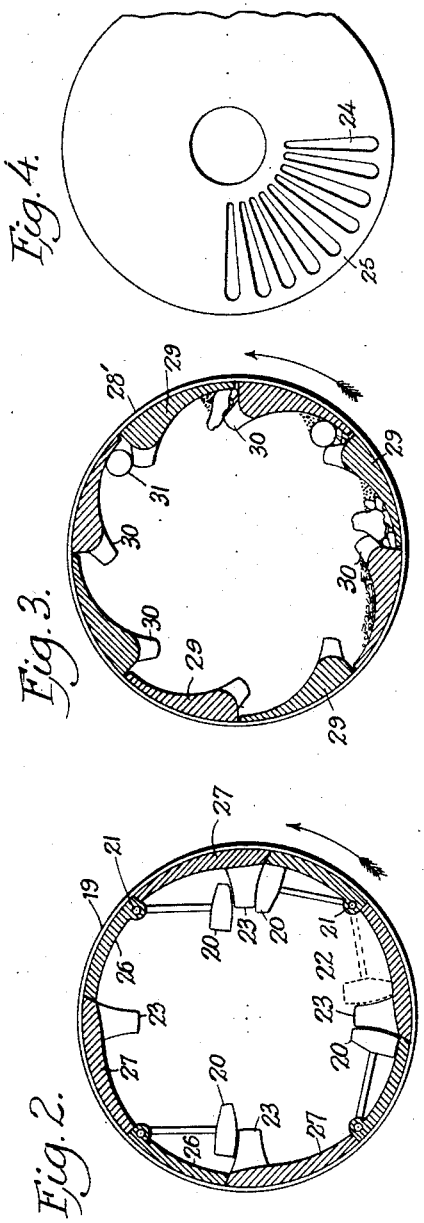
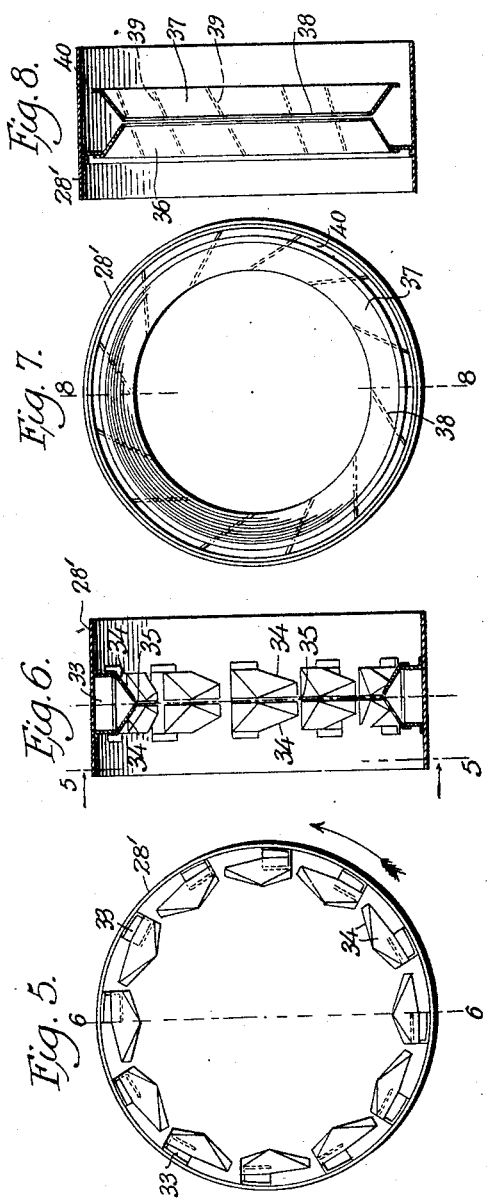

Patented May 15, 1928.

1,670,269

UNITED STATES PATENT OFFICE.

HUGO O. MOEBIUS, OF HANOVER, GERMANY, ASSIGNOR TO AMERICAN MIAG CORPORATION, OF BUFFALO, NEW YORK, A CORPORATION OF NEW YORK.

COOLING AND DRYING APPARATUS AND PROCESS OF CEMENT MAKING ADAPTED TO BE CARRIED ON THEREBY.

Application filed August 2, 1927. Serial No. 210,188.

My said invention relates to a cooling and drying apparatus, and to a process of cement making adapted to be carried on thereby, and it is an object of the invention to so treat cement clinker in the manufacturing process that less space or no space at all will be required for clinker storage and the clinker will be ready for grinding sooner than when made by known methods. Besides this the clinkers will be more easily ground since the sudden cooling causes the clinkers to form cracks or planes of fracture due to contraction.

Another object is to provide improved crushing means.

Another object is to provide an improved contact apparatus for air and pulverized or broken solid material here used for cooling the cement.

Various methods of cooling the clinkers have been proposed but they either require very large and cumbersome cooling drums or the like, with consequent heavy expense or else they leave the clinker so hot that it must be stored for a long time while it slowly cools off. This means that large amounts of capital are tied up for considerable periods of time and that the grinding requires more power due to greater solidity of the clinker. These and other disadvantages of the present practice are obviated by the use of my invention wherein the final cooling takes place after the crushing operation in a very effective manner, so as to leave the crushed clinker in condition for immediate use and thus obviate the necessity for storage of large quantities of clinkers over extensive periods of time.

Referring to the drawings, which are made a part of this application and in which similar reference characters indicate similar parts:

Fig. 1 is a longitudinal section of part of a cement mill, illustrating the nature and location of my improvements, Fig. 2, a section on line 2—2 of Fig. 1, showing a form of crushing means, Fig. 3, a modified form of crushing means.

Fig. 4, an elevation of a wall shown in Fig. 1,

Fig. 5, a section on line 5—5 of Fig. 6,

Fig. 6, a section on line 6—6 of Fig. 5,

Fig. 7, an end view of a modified form of scattering device, and,

Fig. 8, a section on line 8—8 of Fig. 7.

In the drawings, reference character 10 indicates a rotary kiln such as is commonly used in preliminary operation for either dry or wet processes of making cement. The kiln is closed at the lower end by a hood 11 provided with an aperture through which extends a nozzle 12 for fuel such as coal dust fed from a coal silo 13 by a feeder 14 and a rotary fan 15. The action of the fan 15 causes a draft through the kiln 10 and so draws air through the cooling drum hereinafter described, by way of opening 16 and chute 17. From the lower end of the kiln 10 the calcined material falls in the form of clinkers through an opening at 16 and is guided by a chute 17 into the open end of a cooling drum having at its charging end a preliminary cooling chamber 18 of any conventional or desirable construction.

It has been customary to provide longitudinal fins in a long cooling drum for lifting the material and discharging it in sheets extending lengthwise of the drum while causing air to move upward through the drum. This is not fully satisfactory since the air acts unequally on the inner and outer particles in the sheet and for the further reason that the drum must be very long to get a good cooling action, as only a relatively small part of the air acts on the material at any given time due to the wide spaces between successive sheets discharged by adjacent fins. Furthermore, the material is in clinkers some of which are quite large and so reach the end of the drum with a cooled outer surface, but hot inside. In some cases the clinkers are crushed at the discharge end of the drum but the heat remains in the mass and necessitates long storage as above explained.

I propose to crush the clinkers after a preliminary stage of cooling in the drum section 18 by a crusher indicated at 19, the preliminary stage being longer or shorter according to the materials used. In certain cases when arrangement of the cooler directly under the kiln is impracticable owing to want of space and the cooling is to be done after storage, the crusher may be located at the charging end of the cooling drum. One form of crusher that may be used is shown in Fig. 2, and this includes a series of hammers 20 pivoted at 21 said hammers being adapted to swing from the solid line position to an operative position such as that indicated in dotted lines at 22. Axially spaced screening fingers 23 coact with the hammers in breaking up the clinkers and serve also to stir up the mass and lift the clinkers that have not been sufficiently broken up to pass through slots 24 in a slotted wall 25 adjacent the crusher, which wall prevents the clinkers from passing on to the discharge end before they have been made sufficiently fine. The wall should have openings of sufficient size only to permit the crushed clinkers to pass through, the solid parts of the wall serving to change the velocity of the air current and so permit the cement dust to settle out of it. Preferably the hammers are somewhat pointed or narrowed at the working end to increase their breaking action. Preferably also the supporting means for the hammers and the screening abutments consists of a series of separately removable segments 26, 27 for convenience and economy in replacing any damaged parts. The purpose in axially spacing the screening fingers is to cause them to lift the larger fragments while permitting the fine stuff to pass through between them.

Crushers of many other types may be found useful for the purpose indicated and I have shown one other form in Fig. 3 where a crusher 28 has duplicate segments 29 with spaced-apart screening fingers 30 so shaped as to stir up the mass and lift clinkers as above described. These fingers also serve to lift balls 31, which fall on the clinkers and break them up in an obvious manner.

After the clinker has been crushed fine enough to pass through the slotted wall or screen 25 it is further cooled in what may be called the secondary cooling chamber 32 of the drum. This chamber is provided with lifting and scattering means of some such character as those shown in Figs. 5 and 6, though any suitable means may be used. In this form the scattering means are so arranged as to strew the crushed material in a curtain extending crosswise of the drum whereby the air current impinges on all particles with substantially equal action and all parts of the current have their temperature equally reduced. Such a curtain is produced by means consisting of buckets arranged to lift a part of the crushed clinkers as the drum rotates in the direction of the arrow (Fig. 5), and gradually permit the material to fall out between oppositely arranged wings 34 providing annularly extending slots between them at 35. The buckets may each be made of a single piece of sheet metal bent to a U-shape as clearly shown at the top of Fig. 6 and fastened to the shell 28' of the drum, the buckets being closed at the rear, while the wings may be two separate pieces suitably bent and preferably spaced to leave an annularly extending slot between them from end to end as shown at the middle of Fig. 6. It will be evident that as the drum rotates each bucket will fill itself when at the bottom of the drum and that the material will be gradually scattered or sifted through the annular extending slot 35, which action may continue all the way around the circle or nearly so, the fine clinkers forming a curtain across the axis of the drum.

In the modified form of Figs. 7 and 8 I have shown a continuous ring 36 of suitable material secured to the shell 28' of the drum, this ring being bent and laterally inclined to facilitate proper feeding. Another ring 37 similarly inclined is fixed to said shell adjacent the first in such relation as to leave an annular slot 38 between them. Partitions 39 are arranged in the space between the rings. These partitions may connect the rings and they serve as scoops or buckets to lift the material entering such space at 40. It will be seen that the scoops lift the material and feed it gradually out through the slot 38 to form a curtain as previously described. Of course the scoops may be arranged spirally with equally good results. When so arranged the scattering device may function as a conveyor, particularly if the drum is horizontal.

It will be understood that these scattering devices may be of any desirable number for scattering the material in such a number of curtains as will cause it to be cooled to the desired degree. By reason of the high efficiency of this apparatus a drum much shorter than would otherwise be needed will cool the clinkers sufficiently to permit them to be ground immediately without storage. From the drum they pass as usual to a chute 41.

The specific crushing device and the lifting and scattering means may each be used in other situations and in connection with other processes. Obviously these devices could readily be combined for use in breaking up and drying wet coal or similar materials, the scattering device could be used for other drying or analogous purposes, for treating fluent solids with gases having chemical action thereon, and in other situations where solid material is to be treated by means of a fluid current.

It will be understood that the buckets in the form first described may be arranged spirally or otherwise about the drum, the essential feature being to scatter the materials to be cooled, dried or otherwise treated, crosswise of the current of air or other fluid passing through the drum. The drum is shown as inclined but may be horizontal, and other changes may be made as will be understood by those skilled in the art.

Having thus fully described my said invention what I claim as new and desire to secure by Letters Patent is:

1. A process of cement manufacture including the steps of burning the pulverized raw material to clinkers, partially cooling the clinkers, crushing them, agitating the crushed material, and subjecting it to a blast of cooling air while being agitated.

2. A continuous process of treatment of coarse or lumpy solid material including crushing the same, and scattering the crushed material in thin curtains approximately at right angles to the direction of a fluid current.

3. The combination of a rotary tubular member, means operated by the rotation of the tubular member for crushing material therein, means within the tubular member operating at the discharge side of the crushing zone to produce a thin sheet of freely falling crushed material across the axis of the tubular member, and means for creating a current of gas longitudinally of the tubular member.

4. A device as in claim 3, said current traveling in the opposite direction to the material in said tubular member.

5. The combination of a rotary tubular member, means operated by the rotation of the tubular member for crushing material therein, means within the tubular member operating at the discharge side of the crushing zone to produce a thin sheet of freely falling crushed material across the axis of the tubular member, means for creating a current of gas longitudinally of the tubular member and a perforated wall adjacent the crushing means occupying a sufficient amount of the cross-section of the tubular member to check the passage of the current of gas so as to permit dust to settle out of it.

6. The combination of a rotary tubular member, means operated by the rotation of the tubular member for crushing material therein, said means comprising screening fingers and falling crushers acting on the coarse material separated from the finer material by said fingers, means within the tubular member operating at the discharge side of the crushing zone to produce a thin sheet of freely falling crushed material across the axis of the tubular member, and means for creating a current of gas longitudinally of the tubular member.

7. The combination of a rotary tubular member, means operated by the rotation of the tubular member for crushing material therein, said tubular member being provided with annularly arranged discharged slots operating at the discharge side of the crushing zone to produce a thin sheet of freely falling crushed material across the axis of the tubular member, and means for producing a current of gas longitudinally of the tubular member.

8. Cement making apparatus comprising a rotary tubular member, preliminary cooling means for hot clinkers, means operated by the rotation of the tubular member for crushing such clinkers, final cooling means within the tubular member operating at the discharge side of the crushing zone to produce a plurality of thin sheets of freely falling crushed material across the axis of the tubular member, and means for creating a current of gas longitudinally of the tubular member in the opposite direction to the travel of the material operated on.

9. The combination of a rotary tubular member, means within the tubular member to produce a thin sheet of freely falling material across the axis of the tubular member, and means for creating a current of gas longitudinally of the tubular member.

10. The combination of a rotary tubular member, a circular series of buckets within the tubular member having annularly extended discharge slots arranged to produce a thin sheet of freely falling material across the axis of the tubular member, and means for creating a current of gas longitudinally of the tubular member.

11. In combination, a rotary tubular member, means for feeding material thereto at one end, means to produce a plurality of thin sheets of freely falling material across the axis of the tubular member, means for causing a current of gas to move lengthwise of the tubular member, and means adjacent the feeding point to check the current of gas thereby permitting the suspended dust to settle.

12. In a cement machine, a rotary tubular member, means for feeding hot clinkers thereto, crushing means operated by the rotation of the tubular member, cooling means in said tubular member acting on the crushed material, and a screen between said crushing means and said cooling means to hold back insufficiently crushed material.

13. The combination of a rotary tubular member, sets of screening fingers arranged in series about the tubular member, and falling crushers acting on the larger lumps segregated from the finer material by the screening fingers.

14. A process comprising creating a fluid current and feeding fluent solid material thereto in thin sheets extending crosswise of the current.

In testimony whereof I affix my signature.

HUGO O. MOEBIUS.